United States Patent [19]

Masuda

[11] Patent Number: 5,666,386

[45] Date of Patent: Sep. 9, 1997

[54] DIGITAL DEMODULATING APPARATUS CAPABLE OF SELECTING PROPER SAMPLING CLOCK FOR DATA TRANSMISSION SPEED

[75] Inventor: Mitsuru Masuda, Tokyo, Japan

[73] Assignee: NEC Corporation, Tokyo, Japan

[21] Appl. No.: 729,392

[22] Filed: Oct. 11, 1996

Related U.S. Application Data

[63] Continuation of Ser. No. 348,196, Nov. 28, 1994, abandoned.

[30] Foreign Application Priority Data

Nov. 26, 1993 [JP] Japan ..................... 5-296385

[51] Int. Cl.$^6$ ..................... H04L 7/00
[52] U.S. Cl. ............. 375/328; 375/332; 375/355; 329/306
[58] Field of Search ............... 375/325–328, 375/329, 332, 344–345, 355; 329/304–308, 346

[56] References Cited

U.S. PATENT DOCUMENTS

| | | | |
|---|---|---|---|
| 4,528,512 | 7/1985 | Yoshida | 329/307 |
| 4,546,322 | 10/1985 | Crutcher | 329/308 |
| 4,949,357 | 8/1990 | Sehier | 329/307 |
| 5,163,159 | 11/1992 | Rich et al. | 375/344 |
| 5,283,780 | 2/1994 | Schuchman et al. | 375/344 |
| 5,440,267 | 8/1995 | Tsuda et al. | 329/308 |

*Primary Examiner*—Young T. Tse
*Attorney, Agent, or Firm*—Sughrue, Mion, Zinn, Macpeak & Seas

[57] ABSTRACT

In a digital data demodulating apparatus, total number of low-pass filters is reduced by supplying variable sampling clock signals to A/D converters coupled to the low-pass filters. The digital data demodulating apparatus for receiving/demodulating a transmission signal that is modulated by digital data in a predetermined modulation manner, includes: a detecting unit for detecting the transmission signal; a low-frequency component passing unit for causing a low-frequency component of the transmission signal detected by the detecting unit to selectively pass therethrough; an analog-to-digital (A/D) converting unit for A/D-converting the output from the low-frequency component passing unit into a digital transmission signal; a demodulating unit for demodulating the digital transmission signal from the A/D converting unit; and a switching unit for switching a frequency of a sampling clock produced from the A/D converting unit in response to an external switching instruction.

5 Claims, 2 Drawing Sheets

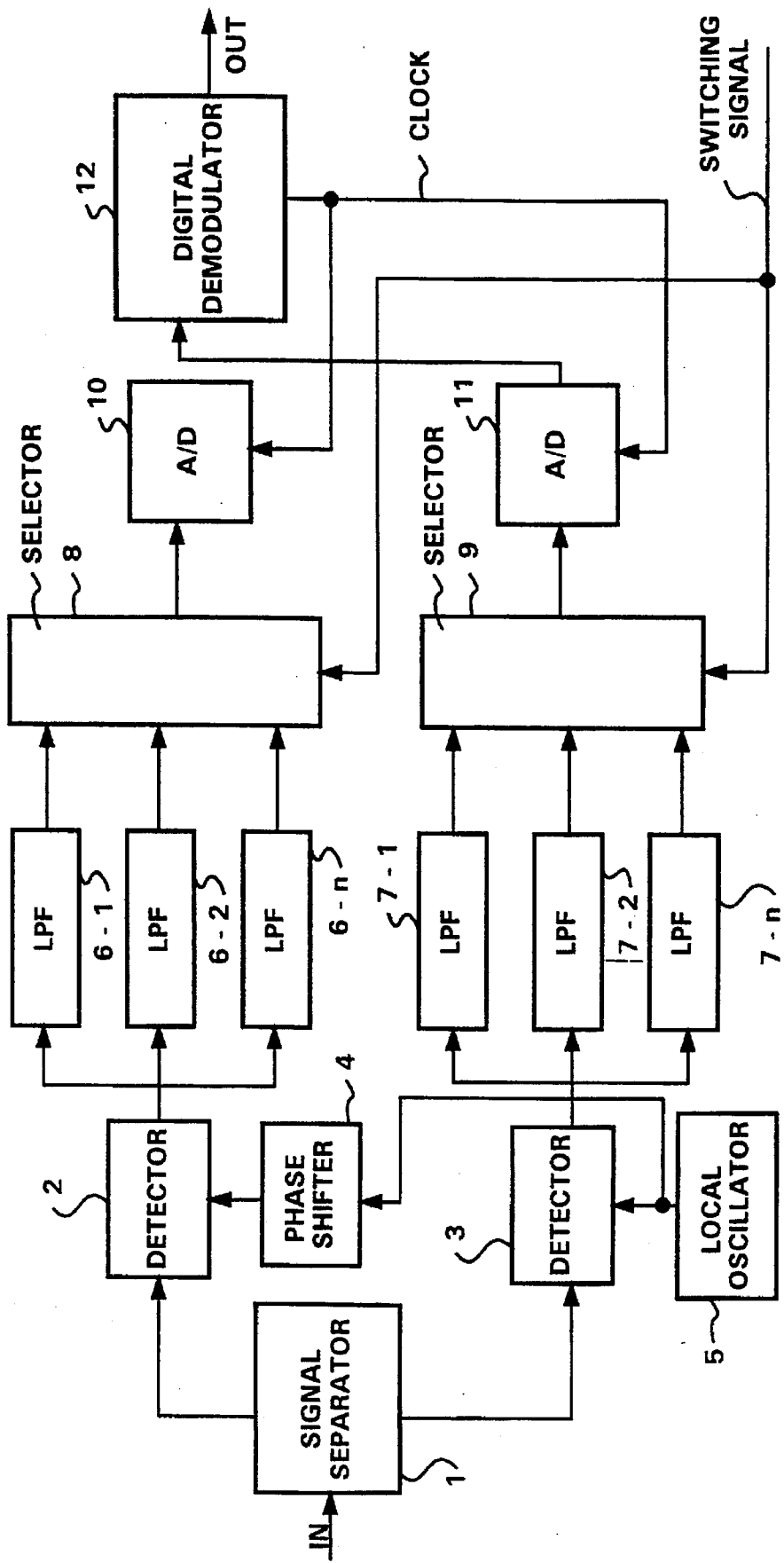

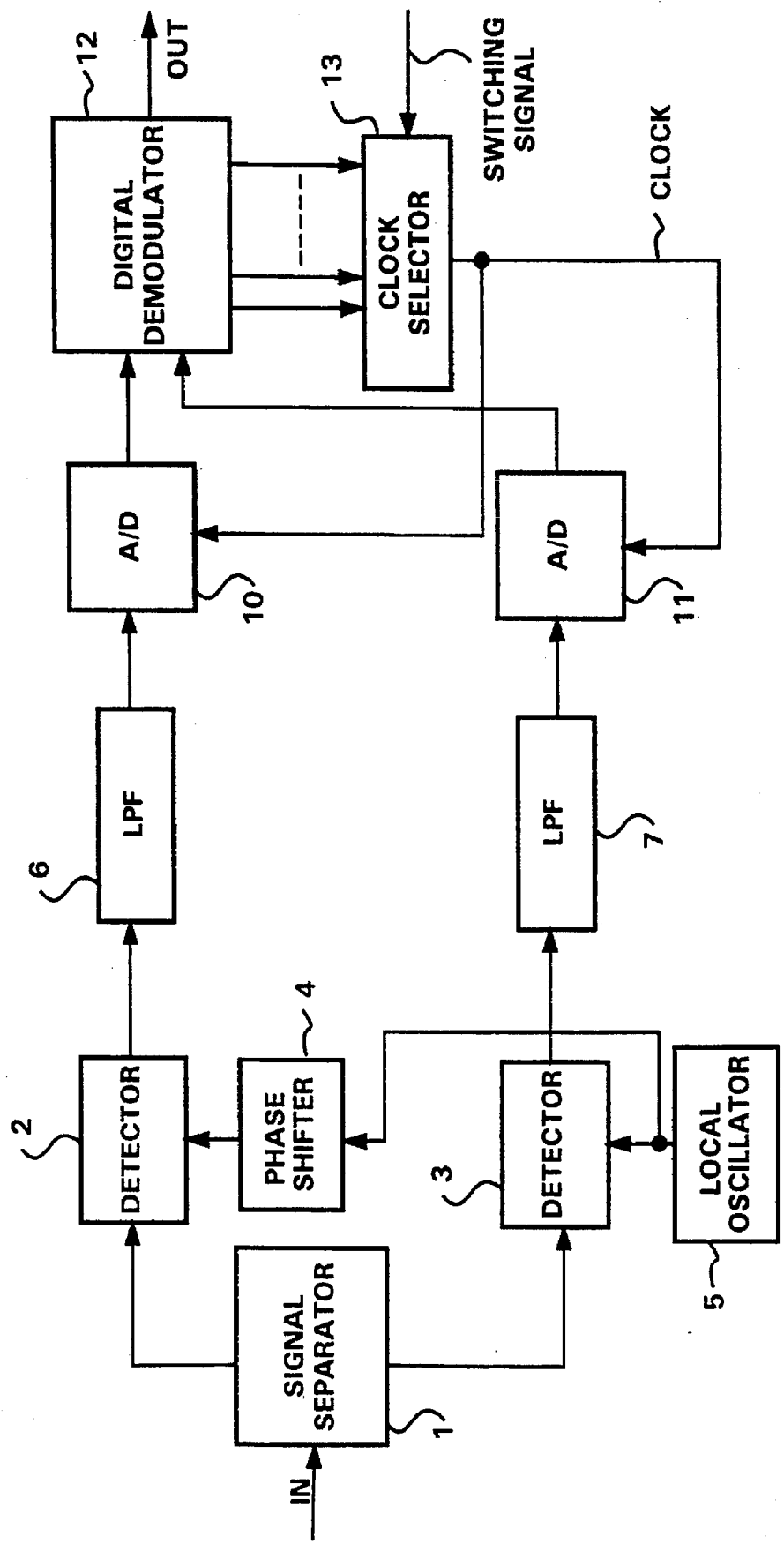

DIGITAL DEMODULATING APPARATUS CAPABLE OF SELECTING PROPER SAMPLING CLOCK FOR DATA TRANSMISSION SPEED

This is a continuation of application Ser. No. 08/348,196, filed on Nov. 28, 1994, now abandoned.

BACKGROUND OF THE INVENTION

1. Field of the Invention

The present invention generally relates to a demodulating apparatus. More specifically, the present invention is directed to a demodulating apparatus employed in a transmission system in which digital data is modulated by a phase modulating method and the phase-modulated digital data is transmitted.

2. Description of the Prior Art

A typical circuit arrangement of this sort of a conventional demodulating apparatus is shown in FIG. 1. In this conventional demodulating apparatus, PSK-modulated digital signal which is modulated by way of the PSK (phase shift keying) modulating method is received, and then this PSK-modulated digital signal is demodulated.

In this case, it is assumed that this demodulation system is realized by employing a single demodulator for demodulating transmission signals having respective different transmission speeds (modulation speeds).

In this demodulating apparatus, the modulated signal entered from the input terminal is separated into two series of the modulated signals by a signal separator 1, which will then be supplied to two detectors 2 and 3. In these detectors 2 and 3, these modulated signals are multiplied by local oscillation signals derived from a local oscillator 5. One local oscillation signal is phase-shifted by a phase shifter 4. These input modulated signals are quasi-synchronizing-detected to be converted into baseband signals. At this time, the oscillation signal from the local oscillator 5 has the same frequency as that of the carrier wave contained in the modulated signal. Since one oscillation signal is phase-shifted by 90° in the phase shifter 4, a pair of local oscillation signals which are perpendicular to each other are produced and then supplied to the corresponding detectors 2 and 3, respectively.

Two series of the baseband signals which have been quasi-synchronizing-detected are entered into groups of low-pass filters (LPFs) 6-1 to 6-n and 7-1 to 7-n, respectively. These low-pass filters 6-1 to 6-n and 7-1 to 7-n have characteristics corresponding to the transmission speeds of the received modulated signals in order to remove unwanted signals (spurious signals) from the respective baseband signals. Accordingly, a return noise can be suppressed and a poststage circuit for these low-pass filters can be prevented from being saturated.

The filter outputs from the LPFs 6-1 to 6-n are selectively derived by a selector 8, and similarly, the filter outputs from the LPFs 7-1 to 7-n are selected by a selector 9 in accordance with the transmission speed, respectively. To achieve this signal selection, these selectors 8 and 9 are controlled in response to externally supplied switching signals. The analog signals outputted from the respective selectors 8 and 9 are converted into digital signals by A/D converters 10 and 11 in response to a sampling clock outputted from a digital demodulator 12, and thereafter demodulated by this digital demodulator 12.

It should be noted that the LPFs 6-1 to 6-n and 7-1 to 7-n have such functions to avoid occurrences of the return noise in the digital signal process effected in the digital demodulator 12 provided at the poststage, and also saturation of the poststage circuit caused by the adjacent waves. Since the pass bandwidths of the low-pass filters are determined on the basis of the transmission speeds and the levels of the adjacent waves, it is required that a demodulating apparatus for demodulating the data with the different transmission speeds is equipped with a plurality of low-pass filters 6-1 to 6-n and 7-1 to 7-n capable of accepting all of these different transmission speeds, and also with the selectors 8 and 9 for properly switching these low-pass filters.

Now, a description is made of a selection of the LPFs 6-1 to 6-n and 7-1 to 7-n in the demodulating apparatus of FIG. 1. It should also be noted that the adverse influences caused by the adjacent waves are negligible in this case. It is now assumed that there are three sorts of transmission speeds of the signals demodulated by this PSK demodulating circuit, i.e., 2 Mbps, 10 Mbps, and 20 Mps (each of symbol speeds being 1 Mbps, 5 Mbps, and 10 Mbps), and further the maximum sampling clock speed is 20 MHz due to hardware restrictions. Under such a condition, since the maximum sampling clock speed (frequency) is limited to 20 MHz, the number of samples per 1 symbol is limited to "2".

Also, the low-pass filters are determined based on the specifications required by the demodulator, and thus determined based upon the below mentioned conditions in this case:

$$Fc = (0.7 \times symbol\ speed) Hz\ to\ (symbol\ speed)\ Hz \quad \text{---} \quad (1)$$

Note: Symbol Fc shown in equation (1) indicates the cut off frequency of LPF.

As apparent from the foregoing descriptions, the following three different sorts of LPFs corresponding to each of the symbol speeds are required. The cut off frequency Fc of the LPF selected to the symbol speed 1 Mbps is 0.7 MHz to 1 MHz; the cut off frequency Fc of the LPF selected to the symbol speed 5 Mbps is 3.5 MHz to 5 MHz, and further the cut off frequency Fc of the LPF selected to the symbol speed 10 Mbps is 7.0 MHz to 10 MHz. That is, three different sorts of LPFs 6-1 to 6-3, and 7-1 to 7-3 must be previously employed in the conventional demodulating apparatus.

In the conventional demodulating apparatus shown in FIG. 1, the sampling clock produced from the digital demodulator 12 is constant (namely, number of samples per 1 symbol is constant), and therefore, when the transmission speed is increased, it is not possible to increase the number of samples due to the hardware restrictions. As a consequence, a plurality of low-pass filters must be employed in accordance with the transmission speeds and must be selectively used in order to eliminate the return noise. Thus, a plurality of LPFs and the selectors are necessarily required, resulting in increases of the hardware.

SUMMARY OF THE INVENTION

An object of the present invention is to provide a demodulating apparatus capable of freely switching and controlling a sampling clock in response to transmission speeds, and also capable of utilizing a common LPF (low-pass filter) with respect to various transmission speeds.

To achieve the above-described object, according to the present invention, there is provided a demodulating apparatus for receiving/demodulating a transmission signal that is modulated by digital information in a predetermined modulation manner, which comprises:

detecting means for detecting the transmission signal;

low-frequency component passing means for causing a low-frequency component of the transmission signal detected by the detecting means to selectively pass therethrough;

analog-to-digital (A/D) converting means for A/D converting the output from the low-frequency component passing means into a digital transmission signal;

demodulating means for demodulating the digital transmission signal from said A/D converting means; and switching means for switching a frequency of a sampling clock supplied to said A/D converting means in response to an external switching signal.

BRIEF DESCRIPTION OF THE DRAWINGS

For a better understanding of the present invention, reference is made of the detailed description to be read in conjunction with the accompanying drawings, in which:

FIG. 1 is a schematic block diagram for showing a conventional demodulating apparatus; and FIG. 2 is a schematic block diagram for representing a demodulating apparatus according to an embodiment of the present invention.

DETAILED DESCRIPTION OF THE PREFERRED EMBODIMENTS

Referring now to a drawing, an embodiment of the present invention will be described in detail.

FIG. 2 schematically shows a QPSK (quadrature phase shift keying) demodulator according to a preferred embodiment of the present invention. It should be noted that the same reference numerals shown in FIG. 1 will be employed as those for denoting the same, or similar circuits indicated in FIG. 1.

In this demodulating apparatus of FIG. 2, the modulated signal entered from the input terminal is separated into two series of modulated signals by a signal separator 1, which are inputted into a first detector 2 and a second detector 3, respectively. On the other hand, a local oscillation signal produced from a local oscillator 5 and having the same frequency as that of the carrier wave of the modulated signal, is phase-shifted by a 90°-phase shifter 4. As a result, there are two local oscillation signals having a 90°-phase shift from each other. These 90°-phase-shifted local oscillation signals are supplied to the first detector 2 and the second detector 3, so that the above-described modulated signals are quasi-synchronizing-detected to be converted into baseband signals.

Two series of such quasi-synchronizing-detected baseband signals will pass through the corresponding low-pass filters 6 and 7, and thereafter A/D-converted by A/D-converters 10 and 11 in accordance with a sampling clock derived from a digital demodulator 12 into digital baseband signals. Then, these digital baseband signals are demodulated by the digital demodulator 12 in order to avoid occurrences of return noise in the digital signal process of the digital demodulator 12.

It should be noted in this preferred embodiment that this sampling clock is outputted from the digital demodulator 12 in the form of a plurality of sampling clocks having different frequencies from each other, and then the number of samples (sampling frequency) of the sampling clock is variable in response to the transmission speeds in such a manner that a proper sampling clock is selected by a clock selector 13 in response to an external switching signal.

Next, there is shown an example of a sampling clock selection by the clock selector 13 according to this embodiment. It should be understood that adverse influences caused by the adjacent waves are negligible in this demodulating apparatus.

It is now assumed that the transmission speeds of the digital signals demodulated by this QPSK demodulating circuit are three different speeds, i.e., 2 Mbps, 10 Mbps, and 20 Mbps (respective symbol speeds are 1 Mbps, 5 Mbps, and 10 Mbps), and the maximum sampling clock frequency is 20 MHz due to hardware limitations. The low-pass filter is determined based on the specifications required for the demodulator, which are given as the following conditions:

The cut off frequency "Fc" in case that the number of samples is $$2=(0.7 \times symbol\ speed)Hz\ to\ (symbol\ speed)Hz --- \quad (2).$$

The cut off frequency "Fc" in case that the number of samples is $$4=(0.7 \times symbol\ speed)Hz\ to\ (2 \times symbol\ speed)Hz --- \quad (3).$$

The cut off frequency "Fc" in case that the number of samples is $$8=(0.7 \times symbol\ speed)Hz\ to\ (4 \times symbol\ speed)Hz --- \quad (4).$$

The cut off frequency "Fc" in case that the number of samples is $$16=(0.7 \times symbol\ speed)Hz\ to\ (8 \times symbol\ speed)Hz --- \quad (5)$$

Note: Symbol "Fc" indicates the cut off frequency of LPF 6 and 7.

Under the above-described conditions, the cut off frequencies of the low-pass filters are calculated as follows:

Assuming now that the number of samples is 16 when the symbol speed is 1 Mbps, the cut off frequency "Fc" is given from the equation (5):

$$Fc=0.7\ MHz\ to\ 8\ MHz --- \quad (6).$$

Assuming now that the number of samples is 4 when the symbol speed is 5 Mbps, the cut off frequency "Fc" is given from the equation (3):

$$Fc=3.5\ MHz\ to\ 10\ MHz --- \quad (7).$$

Assuming now that the number of samples is 2 when the symbol speed is 10 Mbps, the cut off frequency "Fc" is given from the equation (2):

$$Fc=7.0\ MHz\ to\ 10\ MHz --- \quad (8)$$

If a single LPF having the cut off frequency "Fc" =8 MHz to 10 MHz is available by taking account of these equations (6), (7), (8), then this single LPF can be adapted to the above-described three different sorts of transmission speeds. As indicated in FIG. 2, the LPFs 6 and 7 are provided for each of the baseband signal series and the cut off frequencies of these LPFs 6 and 7 are set to 8 MHz to 10 MHz, respectively, so that this demodulating apparatus are acceptable to all of the transmission speeds.

As previously described, according to the present invention, since the number of samples per 1 symbol is varied in correspondence with the transmission speeds of the transmission signal, and the LPF in common with all of these transmission speeds is employed, no longer a plurality of LPFs and selectors are required in response to the transmission speeds. As a consequence, there is an advantage that the entire circuit scale can be reduced. Even when there are many different transmission speeds and therefore two or more low-pass filters are required, the total number of low-pass filters may be considerably reduced, as compared with that of the conventional LPFs. Accordingly, there is a merit to reduce the entire circuit scale of the demodulating apparatus.

What is claimed is:

1. A demodulating apparatus for demodulating a transmission signal which is modulated by digital information in a predetermined modulation manner, comprising:

detecting means for detecting said transmission signal;

low-frequency component passing means for causing a low-frequency component of the transmission signal detected by said detecting means to selectively pass therethrough;

analog-to-digital (A/D) converting means for A/D-converting the output from said low-frequency component passing means into a digital transmission signal;

demodulating means for demodulating the digital transmission signal from said A/D converting means, said demodulating means delivering sampling clocks in parallel, each of said sampling clocks having different respective frequencies in accordance with a number of samples for one symbol; and switching means for selecting one of said sampling clocks thereby to supply a selected sampling clock to said A/D converting means in response to an external switching signal.

2. A demodulating apparatus as claimed in claim 1, wherein a transmission speed of said transmission signal is freely settable as a plurality of different transmission speeds, and said external switching signal instructs to switch said sampling clock frequencies in correspondence with said set transmission speeds.

3. A demodulating apparatus as claimed in claim 1, wherein:

said transmission signal corresponds to a phase modulated signal; and said detecting means includes means for producing one pair of local oscillation signals having the same frequency as that of a carrier wave of said transmission signal and also a phase relationship of 90° with each other; and multiplying means for multiplying said one pair of local oscillation signals by said transmission signal to produce baseband signal, respectively.

4. A demodulating apparatus as claimed in claim 2, wherein:

said transmission signal corresponds to a phase modulated signal; and said detecting means includes means for producing one pair of local oscillation signals having the same frequency as that of a carrier wave of said transmission signal and also a phase relationship of 90° with each other; and multiplying means for multiplying said one pair of local oscillation signals by said transmission signal to produce baseband signal, respectively.

5. A demodulating apparatus as claimed in claim 1, wherein said switching means switches the frequency of the sampling clock in accordance with a transmission speed.

* * * * *